US010003979B2

United States Patent
Ko et al.

(10) Patent No.: US 10,003,979 B2
(45) Date of Patent: Jun. 19, 2018

(54) METHOD FOR GENERATING SIGNAL FOR REDUCING INTERFERENCE IN USER-CENTRALIZED VIRTUAL CELL IN CLOUD WIRELESS CONNECTION NETWORK ENVIRONMENT, AND APPARATUS THEREFOR

(71) Applicant: LG ELECTRONICS INC., Seoul (KR)

(72) Inventors: Hyunsoo Ko, Seoul (KR); Heejeong Cho, Seoul (KR); Hyeyoung Choi, Seoul (KR); Ilmu Byun, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/527,675

(22) PCT Filed: Dec. 10, 2014

(86) PCT No.: PCT/KR2014/012134
§ 371 (c)(1),
(2) Date: May 17, 2017

(87) PCT Pub. No.: WO2016/093390
PCT Pub. Date: Jun. 16, 2016

(65) Prior Publication Data
US 2017/0332250 A1 Nov. 16, 2017

(51) Int. Cl.
*H04W 40/00* (2009.01)
*H04W 16/32* (2009.01)
(Continued)

(52) U.S. Cl.
CPC ......... *H04W 16/32* (2013.01); *H04L 12/4641* (2013.01); *H04W 16/02* (2013.01)

(58) Field of Classification Search
CPC .... H04W 16/32; H04W 16/02; H04L 12/4641
(Continued)

(56) References Cited

U.S. PATENT DOCUMENTS

| 2008/0107074 A1* | 5/2008 | Salmenkaita ....... H04W 72/082 |
| | | 370/330 |
| 2013/0315075 A1* | 11/2013 | Tamura ................. H04W 24/10 |
| | | 370/242 |

(Continued)

FOREIGN PATENT DOCUMENTS

| KR | 1020140125499 A | 10/2014 |
| KR | 1020140134950 A | 11/2014 |

OTHER PUBLICATIONS

SH Park et al., "Joint Precoding and Multivariate Backhaul Compression for the Downlink of Cloud Radio Access Networks", IEEE Transactions on Signal Processing, vol. 61, No. 22, Nov. 15, 2013, pp. 5646-5658.

(Continued)

*Primary Examiner* — Nghi H Ly
(74) *Attorney, Agent, or Firm* — Dentons US LLP (57) ABSTRACT

A method for generating a signal for reducing interference in a user-centralized virtual cell, according to an embodiment of the present invention, comprises the steps of: transmitting a reference signal to a terminal within a user-centralized virtual cell; receiving, from the terminal, a first channel measurement report message including channel information measured by the terminal on the basis of the reference signal; exchanging, with the first channel measurement report message, a second channel measurement report message that another base station within the user-centralized cell receives from another terminal other than the terminal, thereby sharing a channel measurement report message with the another base station; and generating a signal for reducing (Continued)

the interference on the basis of the first channel measurement report and the second channel measurement report message.

18 Claims, 8 Drawing Sheets

(51) Int. Cl.
*H04L 12/46* (2006.01)
*H04W 16/02* (2009.01)

(58) Field of Classification Search
USPC .................... 455/449, 423, 422.1, 522, 69
See application file for complete search history.

(56) References Cited

U.S. PATENT DOCUMENTS

2014/0349667 A1    11/2014   Hahn et al.
2015/0043444 A1*   2/2015    Wei ...................... H04B 7/0413
                                                        370/329

OTHER PUBLICATIONS

P. Demestichas et al, "5G on the Horizon: Key Challenges for the Radio Access Network", IEEE Vehicular Technology Magazine, Sep. 2013, vol. 9, pp. 47-53.

* cited by examiner

METHOD FOR GENERATING SIGNAL FOR REDUCING INTERFERENCE IN USER-CENTRALIZED VIRTUAL CELL IN CLOUD WIRELESS CONNECTION NETWORK ENVIRONMENT, AND APPARATUS THEREFOR

This application is a National Stage Application of International Application No. PCT/KR2014/012134, filed on Dec. 10, 2014, which is hereby incorporated by reference in its entirety for all purposes as if fully set forth herein.

TECHNICAL FIELD

The present invention relates to a cloud radio access network environment, and more particularly, to a method for generating a signal for reducing interference in a user-centric virtual cell in a cloud radio access network environment and apparatus therefor.

BACKGROUND ART

In general, a radio access network (RAN) including a base station (BS) and a user equipment (UE) broadly provides various types of communication services such as a voice service, a data service, etc. to UEs through one or more BSs and in this case, a single BS may cover at least one cell.

Recently, the number of users who use such communication services has exploded with the advancement of the wireless communication technology and BSs have been installed to meet increased traffic requirements.

Thus, the RAN has also been changed from the centralized base station architecture based on a macro to the distributed base station architecture where various types of small cells such as a pico cell, a femto cell and the like are interconnected to a macro cell.

However, there must be a limit on costs and frequency resources in installing additional BSs enough to accommodate the exploded traffic.

Therefore, a UE-centric logical-cell based service providing unit, which is different from the conventional BS-centric physical cell based service providing unit, needs to be introduced for the RAN.

In addition, when the UE-centric logical cell based service providing unit is introduced into the RAN, the operation of a centralized coordinator, which is performed by the BS to cancel interference in the conventional BS-centric physical cell based service providing unit, needs to be performed for UE-centric logical cell based service providing unit and a method therefor also needs to be developed.

DISCLOSURE OF THE INVENTION

Technical Task

A technical task of the present invention is to provide a method of forming a user-centric virtual cell in a cloud radio access network environment.

Another technical task of the present invention is to provide a method of generating a signal for reducing interference in a user-centric virtual cell in a cloud radio access network environment.

A further technical task of the present invention is to provide a method of improving transmission capacity of a signal provided to a UE by cancelling interference in a user-centric virtual cell.

A still another technical task of the present invention is to provide a signal transmission method for efficiently cancelling interference in a user-centric virtual cell even when there is no centralized coordinator.

A still further technical task of the present invention is to provide an apparatus for supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To solve the aforementioned technical problem, according to one embodiment of the present invention, a method of generating a signal for interference reduction by a base station (BS) in a user-centric virtual cell in a cloud radio access network (C-RAN) environment, the method comprising: transmitting a reference signal to a user equipment (UE) in the user-centric virtual cell; receiving, from the UE, a first channel measurement report message including channel information measured by the UE based on the reference signal; sharing channel measurement report messages with another BS in the user-centric virtual cell by exchanging the first channel measurement report message for a second channel measurement report message, which the another BS receives from another UE except the UE; and generating the signal for the interference reduction based on the first and second channel measurement report messages.

To solve the aforementioned technical problem, in generating the signal, the first channel measurement report message is used to determine signal strength of the signal for the interference reduction and the second channel measurement report message is used to reduce interference caused by the signal for the interference reduction to the another UE.

To solve the aforementioned technical problem, the user-centric virtual cell is a virtual cell formed by the UE such that the UE is located at a center of the virtual cell and wherein the UE forms the user-centric virtual cell based on a network state of the C-RAN, strength of reference signals received from at least one BS in the C-RAN environment, and information on loads of the at least one BS.

To solve the aforementioned technical problem, the formation of the user-centric virtual cell comprises: receiving, by the UE, the reference signals transmitted from the at least one BS; measuring the strength of the reference signals and the loads of the at least one BS that transmit the reference signals based on the reference signals; and forming the user-centric virtual cell based on the measured results and the network sate of the C-RAN, wherein an interface for control information transmission is established between the UE and the user-centric virtual cell.

To solve the aforementioned technical problem, when a new UE is added to the C-RAN or when the C-RAN environment is changed due to movement of the UE, the user-centric virtual cell is formed.

To solve the aforementioned technical problem, the first channel measurement report message includes channel information between the BS and the UE and information on interference sensitivity of the UE and wherein the second channel measurement report message includes channel information between the another BS and the another UE and information on interference sensitivity of the another UE.

To solve the aforementioned technical problem, the BS is connected to another BS through a backhaul network in the user-centric virtual cell and wherein the sharing is performed using the backhaul network.

To solve the aforementioned technical problem, generating the signal further comprising: determining a precoder and power allocation used for generating the signal for the interference reduction; and sharing the determined precoder and power allocation with the another BS in the user-centric virtual cell.

To solve the aforementioned technical problem, in generating the signal, a third channel measurement report message received from a BS in another user-centric virtual cell except the user-centric virtual cell is used and wherein the third channel measurement report message includes average channel information and average interference sensitivity information measured by a UE in the another user-centric virtual cell except the user-centric virtual cell.

To solve the aforementioned technical problem, according to one embodiment of the present invention, an apparatus for generating a signal for interference reduction in a user-centric virtual cell in a cloud radio access network (C-RAN) environment, the apparatus comprising: a radio frequency unit configured to include a transmitter and a receiver; and a processor connected to the transmitter and the receiver to support communication of the apparatus, wherein the processor is configured to transmit a reference signal to a user equipment (UE) in the user-centric virtual cell, receive, from the UE, a first channel measurement report message including channel information measured by the UE based on the reference signal, share channel measurement report messages with another apparatus in the user-centric virtual cell by exchanging the first channel measurement report message for a second channel measurement report message, which the another apparatus receives from another UE except the UE, and generate the signal for the interference reduction based on the first and second channel measurement report messages.

To solve the aforementioned technical problem, when generating the signal for the interference reduction, the processor is configured to use the first channel measurement report message to determine signal strength of the signal for the interference reduction and use the second channel measurement report message to reduce interference caused by the signal for the interference reduction to the another UE.

To solve the aforementioned technical problem, the user-centric virtual cell is a virtual cell formed by the UE such that the UE is located at a center of the virtual cell and wherein the UE forms the user-centric virtual cell based on a network state of the C-RAN, strength of reference signals received from at least one apparatus in the C-RAN environment, and information on loads of the at least one apparatus.

To solve the aforementioned technical problem, the formation of the user-centric virtual cell comprises: wherein the processor is further configured to measure the strength of the reference signals and the loads of the at least one apparatus that transmit the reference signals based on the reference signals; and form the user-centric virtual cell based on the measured results and the network sate of the C-RAN, wherein the reference signals transmitted from the at least one apparatus is received by the UE, and wherein an interface for control information transmission is established between the UE and the user-centric virtual cell.

To solve the aforementioned technical problem, when a new UE is added to the C-RAN or when the C-RAN environment is changed due to movement of the UE, the user-centric virtual cell is formed.

To solve the aforementioned technical problem, the first channel measurement report message includes channel information between the apparatus and the UE and information on interference sensitivity of the UE and wherein the second channel measurement report message includes channel information between the another apparatus and the another UE and information on interference sensitivity of the another UE.

To solve the aforementioned technical problem, the apparatus is connected to the another apparatus through a backhaul network in the user-centric virtual cell and wherein the sharing is performed using the backhaul network.

To solve the aforementioned technical problem, when generating the signal, the processor is further configured to determine a precoder and power allocation used for generating the signal for the interference reduction, and share the determined precoder and power allocation with the another apparatus in the user-centric virtual cell.

To solve the aforementioned technical problem, a third channel measurement report message received from an apparatus in another user-centric virtual cell except the user-centric virtual cell is used to generate the signal and wherein the third channel measurement report message includes average channel information and average interference sensitivity information measured by a UE in the another user-centric virtual cell except the user-centric virtual cell.

Advantageous Effects

According to an embodiment of the present invention, a method of forming a user-centric cell in a cloud radio access network environment can be provided.

According to an embodiment of the present invention, a method of generating a signal for reducing interference in a user-centric cell in a cloud radio access network environment can be provided.

According to an embodiment of the present invention, a method of improving transmission capacity of a signal provided to a UE by cancelling interference in a user-centric virtual cell can be provided.

According to an embodiment of the present invention, a signal transmission method for efficiently cancelling interference in a user-centric virtual cell even when there is no centralized coordinator can be provided.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus.

In the specification, when a part "comprises" or "includes" an element, it means that the part further comprises or includes another element unless otherwise mentioned.

Also, the term " . . . module" disclosed in the specification means a unit for processing at least one function or operation, and may be implemented by hardware, software or combination of hardware and software. Moreover, it is to be understood that the singular expression "a" (or "an"), "one" and "a related similar word" used in this specification includes the plural expression unless defined differently on the context of the present invention.

Specific terms used in the embodiments of the present invention are provided to assist understanding of the present invention, and all terms used herein including technical or scientific terms have the same meaning as those generally understood by the person with ordinary skill in the art to which the present invention pertains. Various modifications may be made in the specific terms within the range that they do not depart from technical spirits of the present invention.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Figure 1:
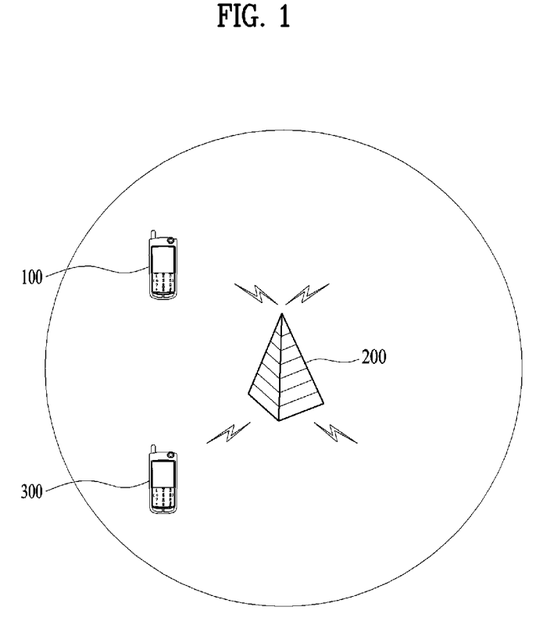
FIG. 1 is a diagram illustrating a base station (BS) and user equipments (UEs) in a general radio access network system.

FIG. 1 is a diagram illustrating a base station (BS) and user equipments (UEs) in a general radio access network system.

Referring to FIG. 1, a radio access network system 100 includes user equipments (UEs) 100 and 300 and a base station (BS) 200. Although the RAN system of FIG. 1 includes only one BS for convenience of description and better understanding of the present invention, it should be noted that one or more BSs and/or one or more UEs may also be contained in the RAN system.

In this specification, a UE can be used as a generic term for a mobile or fixed user-end device such as a terminal, a mobile station (MS), a mobile subscriber station (MSS), a subscriber station (SS), an advanced mobile station (AMS), a wireless terminal (WT), a Machine-Type-Communication (MTC) device, a machine-to-machine (M2M) device, a device-to-device (D2D) device, etc.

In addition, a BS may mean a terminal node of a network directly communicating with the UEs 100 and 300, and replaced with a fixed station, a Node B, an eNode B (eNB), etc.

Any one of all wireless communication devices that use radio waves or infrared rays may be used as a communication unit between the BS 200 and the UEs 100 and 300. Moreover, all kinds of wireless communication units to be developed in the future can be used as the communication unit.

Although transmit/receive (Tx/Rx) antennas of the BS 200 and the UEs 100 and 300 are not shown in FIG. 1, the BS 200 and the UEs 100 and 300 may include a plurality of Tx/Rx antennas. Thus, the BS 200 and the UEs 100 and 300 according to the embodiment may support not only the multiple input multiple output (MIMO) system but also single user-MIMO (SU-MIMO) and multi user-MIMO (MU-MIMO) schemes.

In addition, one or more BSs other than the BS 200 may be included in a single user-centric virtual cell. Moreover, considering that it is possible to transmit a signal to UEs in each user-centric virtual cell, the SU-MIMO and MU-MIMO scheme can be supported in each user-centric virtual cell.

Figure 2:
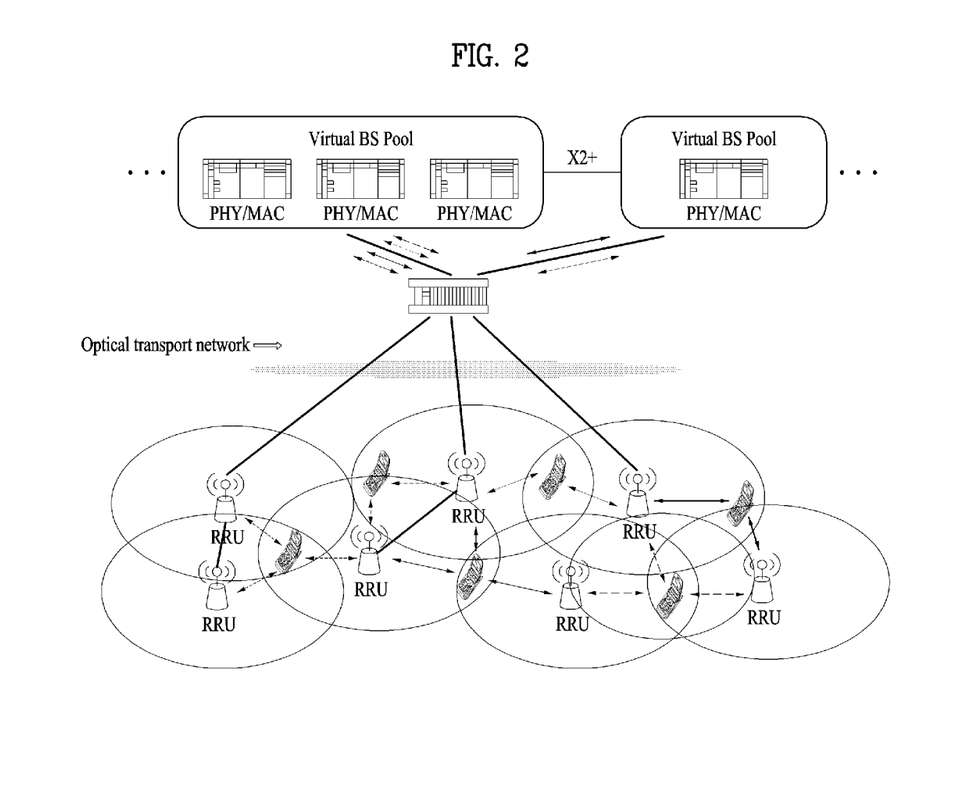
FIG. 2 is a diagram illustrating the concept of a cloud radio access network (C-RAN) to which the present invention is applicable.

FIG. 2 is a diagram illustrating the concept of a cloud radio access network (C-RAN) to which the present invention is applicable.

A cloud radio access network (C-RAN) system is proposed as the next-generation network to overcome not only cost limitation in terms of installation of additional BSs needed to meet requirements of rapidly increasing user traffic but also limited frequency resources.

As described above, the operating scheme for the radio access network typically corresponds to a distributed system in which all BSs can process the user requirements using a maximum amount of resources allocated to each BS.

However, the C-RAN system is a centralized system in which BSs are interconnected through a backhaul so as to maximize efficiency of radio resources and include the cloud computing concept for central processing.

That is, the C-RAN may include a virtual cell or a virtual base station, an access control server for controlling the virtual cell or the virtual base station, and a core network cloud server (e.g., a resource management server, accounting/authentication server, etc.). In addition, respective elements of the C-RAN may directly interact with elements of the core network.

The C-RAN has the following implementation technologies. First, the C-RAN has a technology for implementing the real-time cloud computing server to implement the centralized processing. Second, the C-RAN has a technology for implementing a backhaul network capable of transmitting a variety of high-capacity information by connecting the BS to the cloud server. Third, the C-RAN has a technology for implementing the BS having a BS coordinated communication function, a low-power consumption function, and the like.

When the C-RAN having the above-mentioned characteristics is used, the centralized resource management can be achieved and all services can be processed at an upper end of the BS. Thus, the cost problem caused by the additional BS installation can be solved and the inter-BS coordinated communication for improving cell performance can be easily implemented.

Referring back to FIG. 2, the C-RAN includes a plurality of radio remote units (RRUs) connected to a virtual BS pool through an optical transport network. In this case, the virtual BS may include a physical (PHY) layer and a MAC layer. The individual virtual BSs may be interconnected with each other through an X2 interface and one or more RRUs may be controlled through at least one virtual BS.

In addition, according to the related art, a unique cell area is fixed for each RRU. However, according an embodiment of the present invention, an RRU cluster (BS cluster) can be dynamically adjusted in the C-RAN so that a UE-centric virtual cell can be dynamically allocated. The UE-centric virtual cell can be formed instead of the legacy BS-centric cell. Details of the user-centric virtual cell will be described later.

Figure 3A:
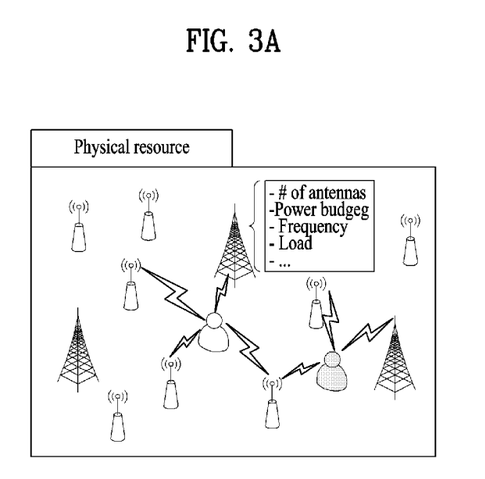
FIGS. 3(a) and 3(b) are diagrams for explaining the concept of a user-centric cell to which the present invention is applicable.
Figure 3B:
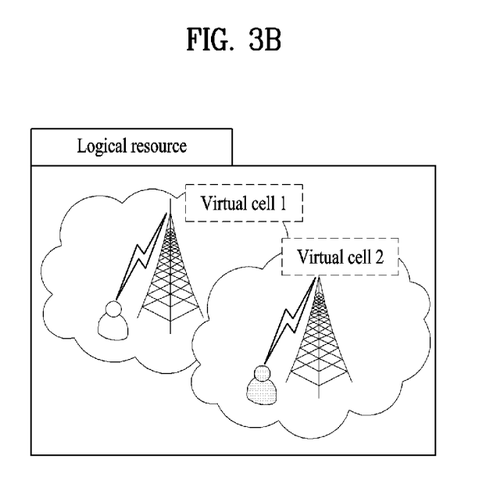

FIGS. 3(a) and 3(b) are diagrams for explaining the concept of a user-centric virtual cell to which the present invention is applicable.

Referring to FIG. 3, FIG. 3(a) shows the BS-centric cell and physical resource allocation, and FIG. 3(b) shows the user-centric virtual cell and logical resource allocation.

If a cell is formed based on a BS and a communication service is provided to the UEs by the corresponding BS as shown in FIG. 3(a), performance of each BS may imply a physical resource of the network. In this case, a power budget, a frequency band, the number of antennas, and a load of each BS may be considered as a physical resource of the corresponding cell.

However, assuming that a UE can receive services with the same QoS/QoE (Quality of Service/Quality of Experience) at the same costs under the same condition, it is not important from the perspective of the UE that the corresponding services are provided by a macro cell, a femto cell, a pico cell or a plurality of cells.

That is, from the perspective of the UE, the most important thing is that physical BSs appropriate for the UE are collected so that a UE-centric virtual cell is constructed as shown in FIG. 3(b).

Assuming that each UE has its own UE-centric virtual cell, this may imply that BS clusters overlap with each other with respect to a UE. However, interference caused to each UE can be managed by coordination between the BSs so that interference management can be more efficiently performed than the BS-centric interference management.

That is, if the UE-centric virtual cell is configured for each UE as shown in FIG. 3(b), even though the BS, which is physically identical to the BS-centric cell, is used as shown in FIG. 3(a), it is possible to solve such a problem that a cell edge user has a relative penalty.

Specifically, assuming that each UE has its own UE-centric virtual cell as shown in FIG. 3(b), i.e., assuming that the BS clusters overlapping with each other form the UE-centric virtual cell, the BSs included in the virtual cell can be connected with each other through a backhaul and simultaneously transmit data to the UE. In this case, a BS that has been caused interference may even assist signal transmission so that interference can be easily cancelled and a high data transfer rate can also be achieved.

In addition, assuming the most ideal case, i.e., a case that all BSs in the network fully cooperate with each other so that one huge virtual MIMO system is implemented, all interference in the network can be fully cancelled.

However, to enable all BSs to fully operate with each other, it is necessary for each BS to have data to be transmitted to UEs. In addition, assuming that the network is enlarged and the number of UEs increases, a backhaul link may have significant loads Moreover, channel information between all UEs and all BSs needs to be measured, the measured channel information should be fed back to the network, and the information should be shared by all the BSs. That is, it may cause a problem that overhead of the network is significantly increased.

To address the above-mentioned issue, only some BSs rather than all the BSs in the network need to cooperate with each other to form the BS cluster.

When the BS cluster, i.e., the user-centric virtual cell is formed by cooperation of only some BSs, interference is not controlled by the entirety of the network but on a cluster basis through coordination of only some BSs in the same cluster. In this case, the cooperation can improve overall performance and also overcome the aforementioned problems.

Hereinafter, whether a method of forming a user-centric virtual cell (BS cluster) through cooperation of some BSs is efficient in terms of cost and performance will be described.

Figure 4A:
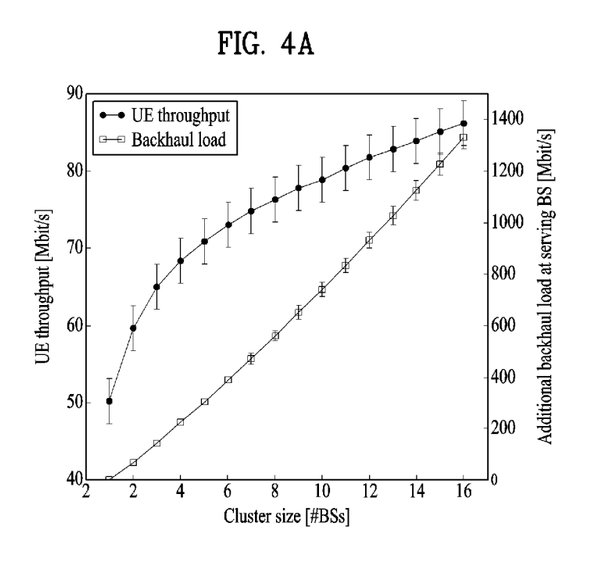
FIGS. 4(a) and 4(b) are graphs showing performance comparison between user-centric cells depending on a size and operation scheme of a user-centric cell to which the present invention is applicable.
Figure 4B:
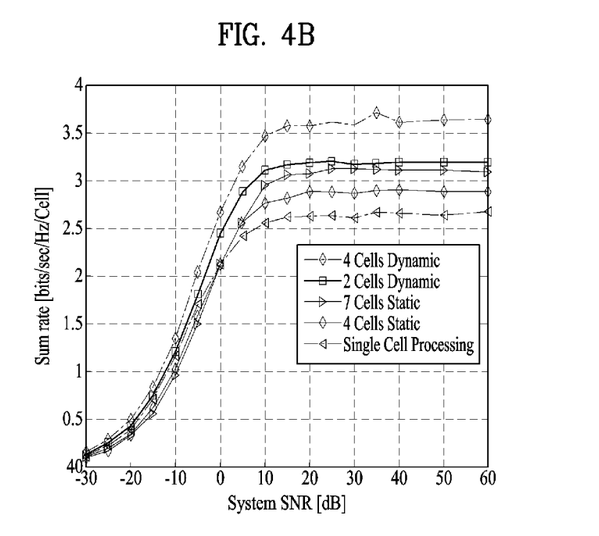

FIGS. 4(a) and 4(b) are graphs showing performance comparison between user-centric cells depending on a size and operation scheme of a user-centric cell to which the present invention is applicable.

FIG. 4(a) shows variation in size of a BS cluster, i.e., difference in performance and cost in accordance with size variation of a user-centric virtual cell. FIG. 4(b) shows performance comparison between methods of forming the BS cluster, i.e., whether the user-centric cell is formed either dynamically or statically.

Referring to FIG. 4(a), a horizontal axis indicates a cluster size, a vertical axis indicates a UE throughput, and a graph shows UE performance and cost in terms of a UE transfer rate and backhaul load.

As shown in FIG. 4(a), the cluster size is in a trade-off relationship with the performance and cost. That is, as the cluster size increases, the performance logarithmically increases. In addition, the backhaul load linearly increases. Moreover, it can be seen that when the cluster size increases up to a predetermined size or higher, loss cost is higher than performance gain that can be achieved.

Accordingly, it is possible to conclude that the cluster size needs to be appropriate.

FIG. 4(b) shows performance comparison between methods of forming the BS cluster, i.e., whether the user-centric cell is formed either dynamically or statically. This may imply whether the cluster edge effect can be eliminated or not.

Here, the cluster edge effect may mean that performance of a UE located at a cluster edge is degraded due to the reason similar to performance degradation of the cell-edge UEs in the legacy cellular network (that is, since a propagation distance of a data signal is relatively long and that of an interference signal is relatively short, the performance degradation occurs).

Referring back to FIG. 4(b), it can be seen that a case in which two cells dynamically form the BS cluster shows higher performance than a case in which 7 cells statically forms the BS cluster.

In conclusion, when the cluster is statically formed using many BSs, the above-mentioned cluster edge problem may continuously occur. However, when the BS cluster is dynamically formed with reference to a UE that intends to transmit data, the cluster edge effect can be relatively improved. Accordingly, it is more efficient to establish the BS cluster in a dynamic manner.

Hereinafter, a description will be given of a method for dynamically forming an appropriate size of the BS cluster, i.e., the user-centric virtual cell to which the present invention is applicable based on the conclusions of FIGS. 4(a) and 4(b).

Figure 5:
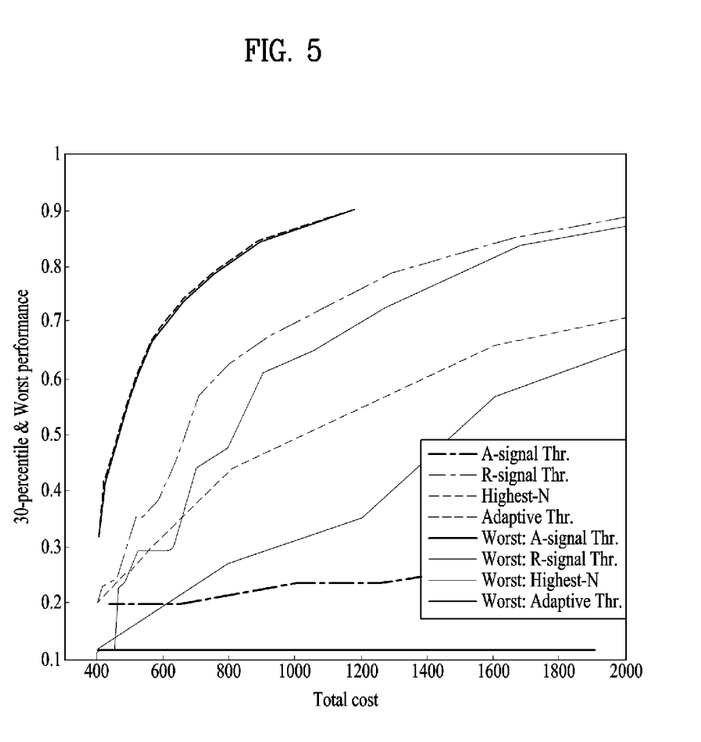
FIG. 5 is a graph showing performance comparison between methods of forming a user-centric cell to which the present invention is applicable.

FIG. 5 is a graph showing performance comparison between methods of forming the user-centric cell to which the present invention is applicable.

When a new UE is added to the network or when the network environment is changed by UE movement (e.g., when the previously formed UE-centric cell is dislocated), the user-centric virtual cell can be formed. The user-centric virtual cell is formed as follows.

1. A UE measures strength of a signal transmitted from a BS.
2. BS clustering is performed (user-centric virtual cell is formed).
3. Interface is formed between the UE and the user-centric virtual cell
4. A data path is formed for the user-centric virtual cell.

In detail, the UE receives a reference signal periodically broadcast from the BS, measures the strength of the reference signal, and collects load information of the BS. Thereafter, the UE selects the BS cluster to form a virtual cell (VC) based on the collected information according to predetermined reference. Here, the selected BS cluster corresponds to BSs that constructs the UE-centric virtual cell.

The UE updates information on the selected BS cluster, i.e., information on the UE-centric virtual cell to the C-RAN. Thereafter, a radio interface for control signal feedback may be generated between the UE and a single BS in the virtual cell, which is formed by the UE and a data path may be established for BSs included in the virtual cell to store data to be transmitted to the UE.

When the UE-centric BS cluster (i.e., the UE-centric virtual cell) is formed, the above-mentioned cluster edge effect can be eliminated. In addition, when the cluster is dynamically changed or generated, data/channel information should be shared or control signal processing needs to be changed. However, when the UE-centric virtual cell is formed as described above, the BS cluster that transmit data to a specific UE is fixed so that the BSs included in the corresponding cluster easily share the data/channel or perform the control signal processing through the backhaul.

To forming the UE-centric virtual cell, the following four methods can be used.

The first method is the highest-N BS clustering method. According to the first method, N BSs are selected in descending order of signal strength and then included in the cluster. The second method is the absolute signal threshold based clustering method. According to the second method, BSs with signal strength equal to or greater than a predetermined threshold are included in the cluster. The third method is the relative signal threshold based clustering method. According to the third method, a specific threshold value is determined with reference to a BS with the highest signal strength and BSs with signal strength equal to or greater than the specific threshold value are include in the cluster to form the user-centric virtual cell. The fourth method is the adaptive threshold clustering method. According to the fourth method, considering the fact that individual UEs experience different network environments, a threshold value is adjusted in an adaptive manner to form the user-centric virtual cell.

Hereinafter, the fourth method, i.e., the adaptive threshold clustering method in which the threshold value is adaptively adjusted to form the user-centric virtual cell will be described in detail.

If a UE k and a BS m are present in the C-RAN system and signal strength, which depends on a path loss between the UE k and the BS m is higher than a specific threshold value, i.e., wmk(1+ym)/xk, the BS m is included a UE k-centric virtual cell.

Thus, the threshold value is determined according to three variables wmk, xk, and ym. The three variables wmk, xk, and ym may imply a network situation, performance experienced by the UE, and a value related to a load of the BS, respectively. That is, the variables xk and ym are adaptively determined. If UE performance is not guaranteed, the threshold value is reduced by increasing the variable xk. If a specific BS has a large amount of loads, the threshold value is increased by increasing the variable ym.

Therefore, although the above-mentioned fourth method is based on the BS m's signal strength smk, which can be measured by the UE k, and the BS m's load information ym, theses variables are compared to the adaptively changing threshold value so that BSs suitable for the UE k are included in the virtual cell.

In FIG. 5, the result of comparison in performance and cost of the four methods used to form the user-centric virtual cell is shown.

Referring to the graph of FIG. 5, among the above-mentioned user-centric virtual cell formation methods, the fourth method has an improved cost-to-performance ratio for UEs ranked in bottom 30 percent in terms of performance or the worst-performance UE compared to the other methods.

That is, the correlation between performance and cost needs to be adjusted and a method for forming the user-centric virtual cell adaptively used for the network is also required. In order to properly manage the user-centric virtual cell without interference, a method for efficiently allocating resources to overlapped BS clusters is required as well.

In other words, at least one user-centric virtual cell is formed and then resources are allocated to the multiple virtual cells. By doing so, interference in a virtual cell where data will be transmitted can be minimized, that is, the virtual cell can be in the optimal transmission state.

To allocate resources to the user-centric virtual cell, resources are actually allocated to several virtual cells which use common radio resources and this resource allocation may be performed in each time slot. In addition, the resource allocation and data transmission may be performed as follows.

1. Measurement of channel state
2. Selection of user-centric cell (UE scheduling)
3. Allocation of precoder and power
4. Data Transmission In detail, each UE measures channel states related to individual BSs and feeds back to the C-RAN through an interface between the corresponding UE and the virtual cell. Thereafter, the C-RAN selects a virtual cell that will perform data transmission based on the feedback channel state information.

In addition, the C-RAN determines the optimal precoder and power for each virtual cell selected for data transmission and each BS performs data transmission based on the determined precoder and power.

Specifically, the present invention proposes a method of forming a user-centric virtual cell and allocating resources for the user-centric virtual cell. More particularly, the invention is directed to a method for determining an optimal precoder for each user-centric virtual cell and allocating optimal power for each user-centric virtual cell.

Figure 6:
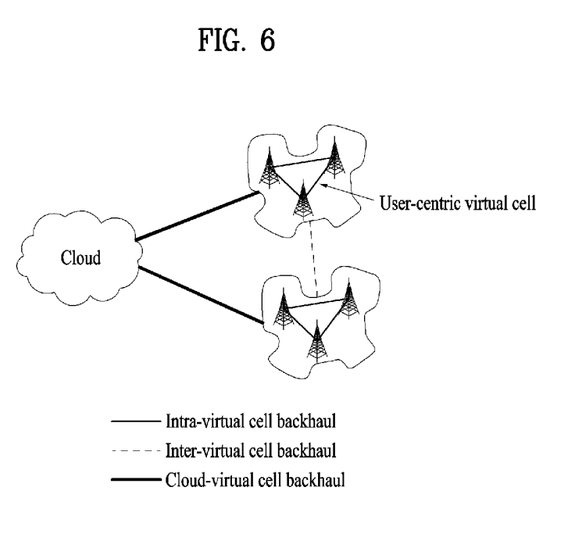
FIG. 6 is a diagram illustrating a relationship between one or more user-centric cell in a cloud radio access network environment to which the present invention is applicable.

FIG. 6 is a diagram illustrating a relationship between one or more user-centric cell in a cloud radio access network environment to which the present invention is applicable.

Referring to FIG. 6, the C-RAN to which the present invention can be applied may include a cloud in charge of central processing for the C-RAN and a user-centric cell that may include at least one BS.

As described above, the C-RAN has the centralized architecture and enables a plurality of BSs to easily cooperate with each other. In addition, the C-RAN has various advantages in terms of virtualization, energy saving, device upgrade, etc.

However, the C-RAN has a disadvantage in that connection among a user-centric cell, a BS and a cloud should be achieved only when there is an ideal backhaul with high capacity and low latency.

Meanwhile, unlike the C-RAN, there is a self-organizing networks (SON) where each BS establishes its own configuration or performs optimization by recognizing its own state without a central coordinator.

However, since the SON does not use the centralized architecture, which is adopted in the C-RAN, individual BSs transmit or receive necessary information. In addition, the configuration or optimization need to be performed based on the distribution algorithm.

In general, the user-centric virtual cell does not require the central coordinator. However, when the main purpose of interference management is beamforming, the user-centric virtual cell uses the centralized algorithm in which the central coordinator is required. Thus, the present invention proposes a beamforming scheme for efficiently cancelling interference in a neighboring user-centric virtual cell even when there is no central coordinator. Particularly, a method for determining a precoder and power allocation to efficiently cancel the interference in the user-centric virtual cell is proposed.

Referring back to FIG. 6, a backhaul of the user-centric cell in the C-RAN environment may include an intra-virtual cell backhaul between BSs in the UE-centric cell, an inter-virtual cell backhaul between UE-centric cells, and a cloud-virtual cell backhaul between each UE-centric cell and the cloud. The following three scenarios may be assumed in association with the above-mentioned backhauls because the user-centric cell has different performance according to backhaul states.

The first scenario is that the intra-virtual cell backhaul, the inter-virtual cell backhaul, and the cloud-virtual cell backhaul are ideal.

The second scenario is that only the intra-virtual cell backhaul is ideal and the inter-virtual cell backhaul and the cloud-virtual cell backhaul are non-ideal.

The third scenario is that the intra-virtual cell backhaul, the inter-virtual cell backhaul, and the cloud-virtual cell backhaul are non-ideal.

In this case, the ideal backhaul may indicate that latency of the corresponding backhaul is set to zero (0) and the capacity of the backhaul is non-limited. For example, the ideal backhaul may indicate that channel information can be freely communicated without any limitation.

The present invention proposes a method of generating a signal to reduce interference in the user-centric virtual cell on the assumption of the second scenario among the above three scenarios. The method will be described in detail with reference to FIG. 7.

Figure 7:
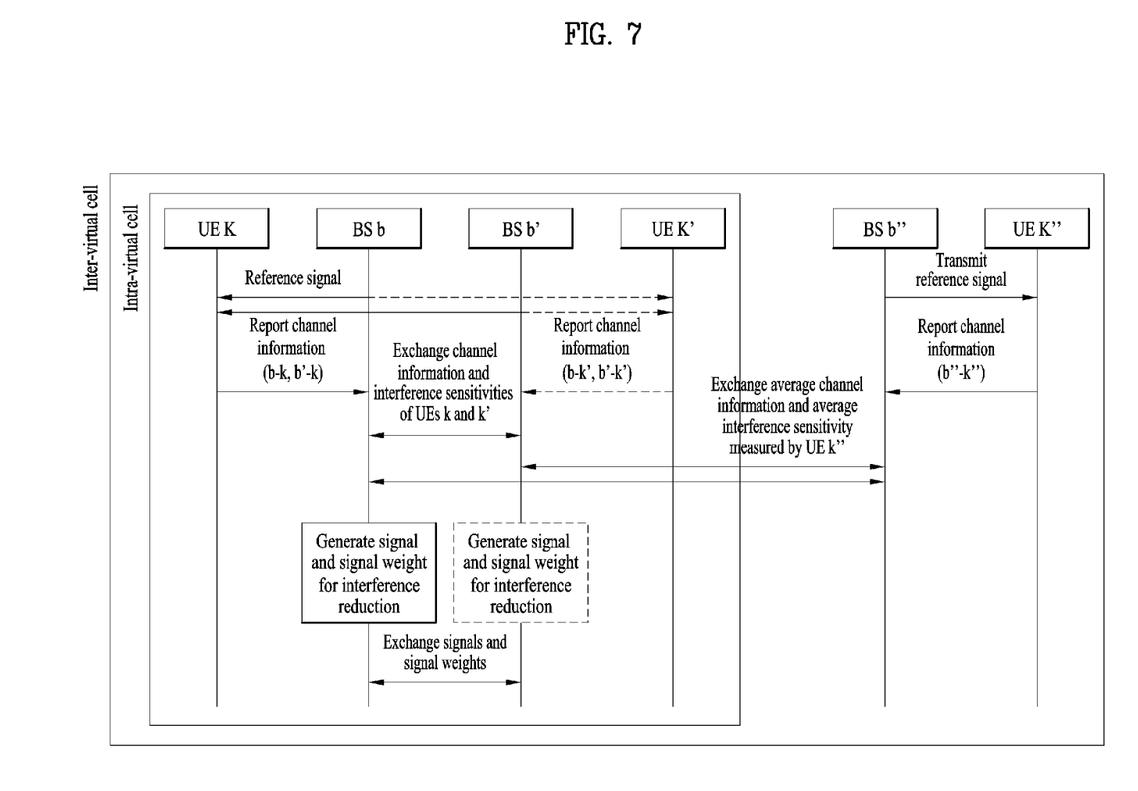
FIG. 7 is a diagram illustrating a method of generating a signal for reducing interference in a user-centric cell in a cloud radio access network environment according to an embodiment of the present invention.

FIG. 7 is a diagram illustrating a method of generating a signal for reducing interference in a user-centric cell in a cloud radio access network environment according to an embodiment of the present invention.

Referring to FIG. 7, a UE K, a UE K', a BS b, and a BS b' are included in a single intra-virtual cell and a UE K" and a BS b" are included in a different inter-virtual cell.

Hereinafter, the intra-virtual cell that includes the UE K, the UE K', the BS b, and the BS b' is referred to as a first user-centric cell and the inter-virtual cell that includes the UE K" and the BS b" is referred to as a second user-centric cell.

Referring back to FIG. 7, in the first user-centric cell, the BSs b and b' may transmit reference signals to the UEs K and K', respectively.

After receiving the reference signals from the BSs b and b', the UEs K and K' measure channel information with respect to the BSs based on the reference signals. Specifically, the UE K measures channel information between the BS b and the UE K and channel information between the BS b' and the UE K. In addition, the UE K' measures channel information between the BS b and the UE K' and channel information between the BS b' and the UE K'.

In this case, the measured channel information may contain a channel state between a BS and a UE and information on interference sensitivity of the corresponding UE.

After receiving the channel information from the UEs K and K', the BSs b and b' may exchange the received channel information with each other to share the channel information.

In addition, the BSs b and b' in the first user-centric cell and the BS b" in the second user-centric cell may exchange the channel information received from the UEs K and K' and channel information received from the UE K" with each other.

Meanwhile, the BS b may generate a signal for reducing interference in the first user-centric cell based on the channel information received from the UE K and the UE K's channel information shared with the BS b' and at this time, the BS b may also use the UE K"s channel information shared with the BS b".

In this case, when generating the signal for the interference reduction in the first user-centric cell, the BS b may also determine a precoder used for generating the signal and power allocation for the signal.

In the present invention, the precoder may mean a control element for determining which signal is assigned for each BS acting as a multi-antenna and the power allocation may mean a control element for adjusting power between several streams for MU-MIMO to be less than maximum power of a given BS.

Referring back to FIG. 7, in the channel information used by the BS b to determine the precoder and power allocation, the channel information received from the UE K may be used to maximize strength of a signal to be transmitted from the BS b' to the UE K. The UE K's channel information received from the BS b' may be used to minimize the effect of interference, which is caused by the BS b to the UE K'. Similarly, the UE K"s channel information received from the BS b" may be used to minimize the effect of interference, which is caused by the BS b to the UE K".

That is, according to an embodiment of the present invention, in channel information used for determining the precoder and power allocation, channel information directly received from a UE may be used to maximize strength of a signal to be transmitted to the corresponding UE. In addition, different UE's channel information received from a different BS may be used to minimize the effect of interference caused by the signal transmitted to the UE to the different UE.

UE's channel information and interference sensitivity is used to determine the precoder and power allocation. Even if information is not freely exchanged, the description can be applied by assuming that average values of the channel information and interference sensitivity are transmitted.

After determining the precoder used for generating the signal for the interference reduction in the first user-centric virtual cell and the power allocation of the signal, the BS b may share the determined precoder and power allocation with the BS b' included in the same user-centric virtual cell.

Figure 8:
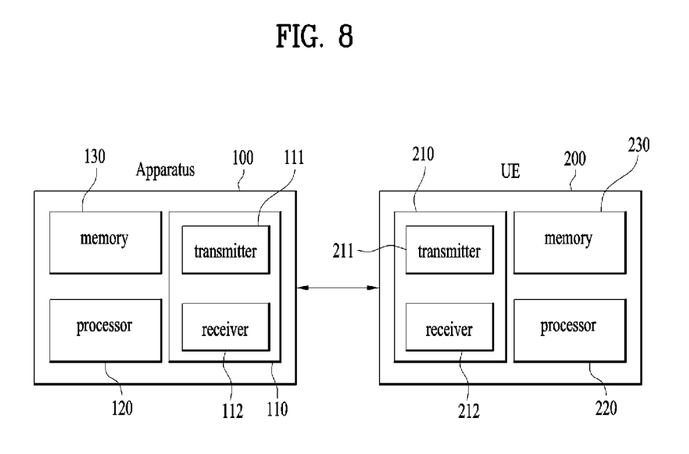
FIG. 8 is a diagram illustrating an apparatus for generating a signal for reducing interference in a user-centric cell in a cloud radio access network environment according to another embodiment of the present invention.

FIG. 8 is a diagram illustrating an apparatus for generating a signal for reducing interference in a user-centric virtual cell in a cloud radio access network environment according to another embodiment of the present invention.

The apparatus for generating the signal for the interference reduction in the user-centric virtual cell in the C-RAN environment is illustrated in FIG. 8. Although the apparatus includes at least one of components shown in FIG. 8, the scope of the present invention is not limited thereto.

Referring to FIG. 8, the apparatus 100 for generating the signal for the interference reduction in the user-centric virtual cell includes a radio frequency (RF) unit 110, a processor 120, and a memory 130. The RF unit 110 includes a transmitter 111 and a receiver 112.

In addition, the processor 120 and the memory 130 of the apparatus 100 for generating the signal for the interference reduction in the user-centric virtual cell controls overall communication processes thereof such as signal processing and hierarchical processing. In addition, the RF unit 110, the processor 120, and the memory 130 may be interconnected with each other.

The RF unit 110 in the apparatus 100 for generating the signal for the interference reduction in the user-centric virtual cell may include the transmitter 111 and the receiver 112. In this case, the transmitter 111 and the receiver 112 may be independently implemented and may be configured to transmit/receive signals to/from another apparatus or a UEs 200

The processor 120, which is functionally connected to the transmitter 111 and the receiver 112 included in the RF unit 110, may be configured to control the transmitter 111 and the receiver 112 to transmit/receive signals to/from another apparatus or the UE 200. In addition, the processor 120 may perform various processing on a signal to be transmitted and then transmit the signal to the transmitter 111. Moreover, the processor 120 may also perform various processing on a signal received by the receiver 112.

If necessary, the processor 120 may store information contained in an exchanged message in the memory 130. The apparatus 100 for generating the signal for the interference reduction in the user-centric virtual cell based on the above-mentioned structure may perform various methods described above with reference to the embodiments of the present invention.

An RF unit 210 of the UE 200 may include a transmitter 211 and a receiver 212. In this case, the RF unit 210 may be configured to transmit/receive signals to/from the apparatus 100 for generating the signal for the interference reduction in the user-centric virtual cell. In addition, a processor 220 of the UE 200, which is functionally connected to the transmitter 211 and the receiver 212, may be configured to control the transmitter 211 and the receiver 211 to transmit/receive signals to/from other devices as well as the apparatus 100 for generating the signal for the interference reduction in the user-centric virtual cell.

Moreover, the processor 220 may perform various processing on a signal to be transmitted and then transmit the signal to the transmitter 211 and also perform various processing on a signal received by the receiver 112.

If necessary, the processor 220 may store information contained in an exchanged message in a memory 230.

The processor 120 of the apparatus 100 and the processor 220 of the UE 200 may indicate (i.e., control, coordinate, manage, etc.) operations of the device 100 and the BS 200. The processors 120 and 220 may be respectively coupled to the memories 130 and 230 for storing program codes and data therein. In other words, the memories 130 and 230 may be respectively coupled to the processors 120 and 220 and store operating systems, applications, and general files therein.

Each of the processors 120 and 220 may be referred to as a controller, a microcontroller, a microprocessor, and a microcomputer. Meanwhile, the processors 120 and 220 may be implemented by hardware, firmware, software, or any combination thereof.

In the case of implementation by firmware or software, the embodiments of the present invention can be implemented by modules, procedures, and/or functions for performing the above-described functions or operations. The software codes are stored in the memories 130 and 230 can be driven by processors 120 and 220. The memories 130 and 230 may be provided within or outside the apparatus 100 and the UE 200 to exchange data with the processors 120 and 220 through the various means known to the public.

When the embodiments of the present invention are implemented using hardware, ASICs (application specific integrated circuits), DSPs (digital signal processors), DSPDs (digital signal processing devices), PLDs (programmable logic devices), FPGAs (field programmable gate arrays), and the like are included in the processors 120 and 220.

The aforementioned methods can be written as computer programs and executed in general-use digital computers using a computer readable recording medium. In addition, a structure of data used in the above-described methods may be recorded in a computer readable recording medium through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk, and hard disk) and optical reading media (e.g. CD-ROM and DVD).

It will be apparent to those skilled in the art that various modifications and variations can be made in the present invention without departing from the spirit or scope of the invention. Therefore, the above embodiments should be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of generating a signal for interference reduction in a user-centric virtual cell in a C-RAN environment can be applied to various C-RAN systems.

What is claimed is:

1. A method of generating a signal for interference reduction by a base station (BS) in a user-centric virtual cell in a cloud radio access network (C-RAN) environment, the method comprising:
   transmitting a reference signal to a user equipment (UE) in the user-centric virtual cell;
   receiving, from the UE, a first channel measurement report message including channel information measured by the UE based on the reference signal;
   sharing channel measurement report messages with another BS in the user-centric virtual cell by exchanging the first channel measurement report message for a second channel measurement report message, which the another BS receives from another UE except the UE; and
   generating the signal for the interference reduction based on the first and second channel measurement report messages.

2. The method of claim 1, wherein in generating the signal, the first channel measurement report message is used to determine signal strength of the signal for the interference reduction and the second channel measurement report message is used to reduce interference caused by the signal for the interference reduction to the another UE.

3. The method of claim 1, wherein the user-centric virtual cell is a virtual cell formed by the UE such that the UE is located at a center of the virtual cell and wherein the UE forms the user-centric virtual cell based on a network state of the C-RAN, strength of reference signals received from at least one BS in the C-RAN environment, and information on loads of the at least one BS.

4. The method of claim 3, wherein the formation of the user-centric virtual cell comprises:
   receiving, by the UE, the reference signals transmitted from the at least one BS;
   measuring the strength of the reference signals and the loads of the at least one BS that transmit the reference signals based on the reference signals; and
   forming the user-centric virtual cell based on the measured results and the network sate of the C-RAN, wherein an interface for control information transmission is established between the UE and the user-centric virtual cell.

5. The method of claim 1, wherein when a new UE is added to the C-RAN or when the C-RAN environment is changed due to movement of the UE, the user-centric virtual cell is formed.

6. The method of claim 1, wherein the first channel measurement report message includes channel information between the BS and the UE and information on interference sensitivity of the UE and wherein the second channel measurement report message includes channel information between the another BS and the another UE and information on interference sensitivity of the another UE.

7. The method of claim 1, wherein the BS is connected to another BS through a backhaul network in the user-centric virtual cell and wherein the sharing is performed using the backhaul network.

8. The method of claim 1, generating the signal further comprising:
   determining a precoder and power allocation used for generating the signal for the interference reduction; and
   sharing the determined precoder and power allocation with the another BS in the user-centric virtual cell.

9. The method of claim 1, wherein in generating the signal, a third channel measurement report message received from a BS in another user-centric virtual cell except the user-centric virtual cell is used and wherein the third channel measurement report message includes average channel information and average interference sensitivity information measured by a UE in the another user-centric virtual cell except the user-centric virtual cell.

10. An apparatus for generating a signal for interference reduction in a user-centric virtual cell in a cloud radio access network (C-RAN) environment, the apparatus comprising:
    a radio frequency unit configured to include a transmitter and a receiver; and
    a processor connected to the transmitter and the receiver to support communication of the apparatus,
    wherein the processor is configured to
    transmit a reference signal to a user equipment (UE) in the user-centric virtual cell,
    receive, from the UE, a first channel measurement report message including channel information measured by the UE based on the reference signal,
    share channel measurement report messages with another apparatus in the user-centric virtual cell by exchanging the first channel measurement report message for a second channel measurement report message, which the another apparatus receives from another UE except the UE, and
    generate the signal for the interference reduction based on the first and second channel measurement report messages.

11. The apparatus of claim 10, wherein when generating the signal for the interference reduction, the processor is configured to use the first channel measurement report message to determine signal strength of the signal for the interference reduction and use the second channel measurement report message to reduce interference caused by the signal for the interference reduction to the another UE.

12. The apparatus of claim 10, wherein the user-centric virtual cell is a virtual cell formed by the UE such that the UE is located at a center of the virtual cell and wherein the UE forms the user-centric virtual cell based on a network state of the C-RAN, strength of reference signals received from at least one apparatus in the C-RAN environment, and information on loads of the at least one apparatus.

13. The apparatus of claim 12, wherein the formation of the user-centric virtual cell comprises:

wherein the processor is further configured to
measure the strength of the reference signals and the loads of the at least one apparatus that transmit the reference signals based on the reference signals; and
form the user-centric virtual cell based on the measured results and the network sate of the C-RAN,
wherein the reference signals transmitted from the at least one apparatus is received by the UE, and
wherein an interface for control information transmission is established between the UE and the user-centric virtual cell.

14. The apparatus of claim 10, wherein when a new UE is added to the C-RAN or when the C-RAN environment is changed due to movement of the UE, the user-centric virtual cell is formed.

15. The apparatus of claim 10, wherein the first channel measurement report message includes channel information between the apparatus and the UE and information on interference sensitivity of the UE and wherein the second channel measurement report message includes channel information between the another apparatus and the another UE and information on interference sensitivity of the another UE.

16. The apparatus of claim 10, wherein the apparatus is connected to the another apparatus through a backhaul network in the user-centric virtual cell and wherein the sharing is performed using the backhaul network.

17. The apparatus of claim 10, wherein when generating the signal, the processor is further configured to
determine a precoder and power allocation used for generating the signal for the interference reduction, and
share the determined precoder and power allocation with the another apparatus in the user-centric virtual cell.

18. The apparatus of claim 10, wherein a third channel measurement report message received from an apparatus in another user-centric virtual cell except the user-centric virtual cell is used to generate the signal and wherein the third channel measurement report message includes average channel information and average interference sensitivity information measured by a UE in the another user-centric virtual cell except the user-centric virtual cell.

* * * * *